UNITED STATES PATENT OFFICE.

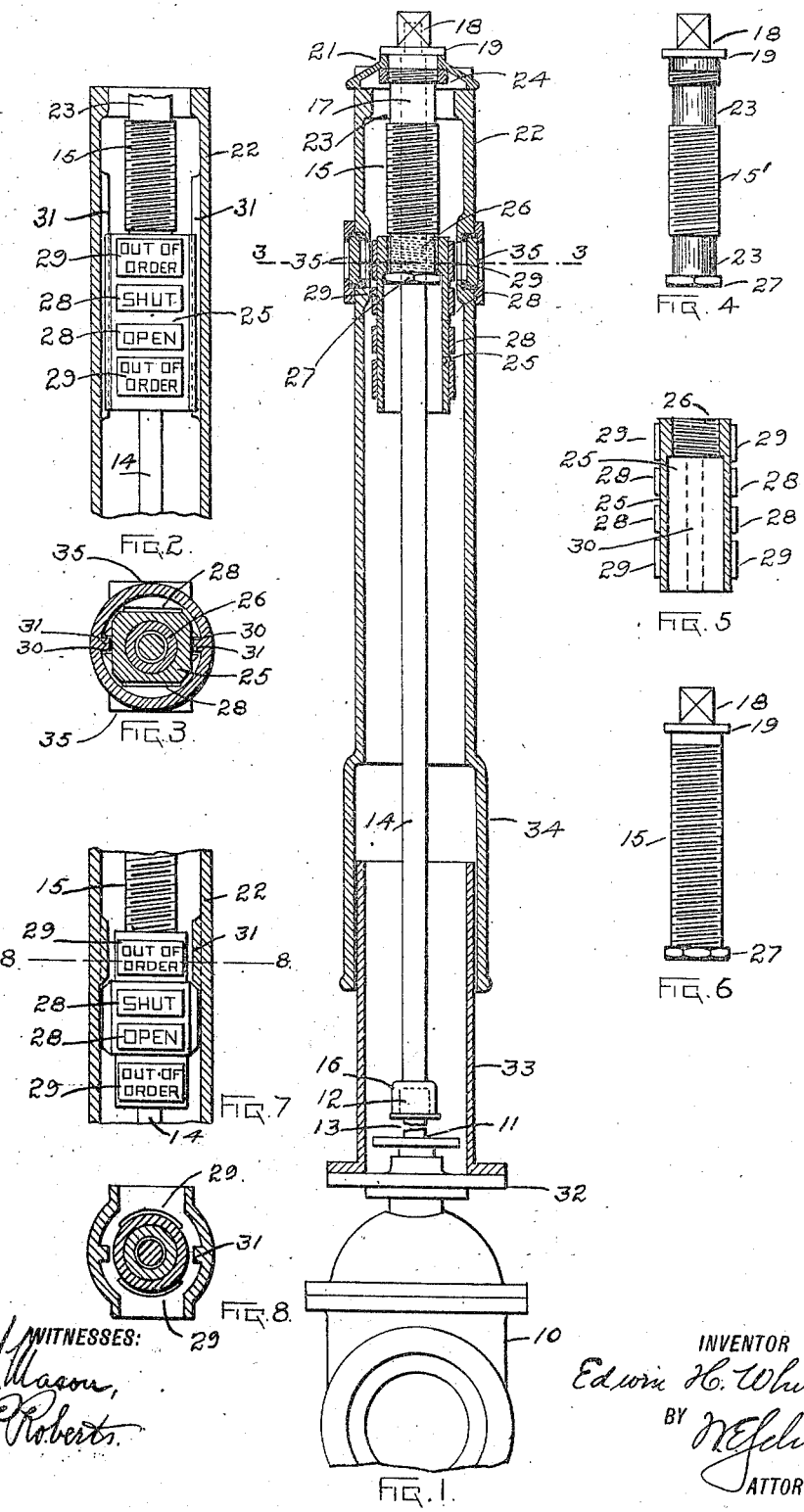

EDWIN H. WHITNEY, OF WATERFORD, NEW YORK, ASSIGNOR TO EDDY VALVE COMPANY, OF WATERFORD, NEW YORK, A CORPORATION OF NEW YORK.

INDICATOR-POST FOR VALVES.

951,927. Specification of Letters Patent. Patented Mar. 15, 1910.

Application filed July 26, 1909. Serial No.509,658.

*To all whom it may concern:*

Be it known that I, EDWIN H. WHITNEY, a citizen of the United States, residing at Waterford, in the county of Saratoga and State of New York, have invented certain new and useful Improvements in Indicator-Posts for Valves, of which the following is a specification.

My invention relates to that class of indicators which are used in connection with valves usually placed beneath the surface of the ground. The actuating valve stem, extends upward to the indicator post head, where the end of the said stem is exposed and made square or angular to receive a wrench for opening or closing the valve.

Although an indicator post may be provided with "tell-tales" or "targets" for showing the position of the gates within the valve, it sometimes happens that at the point where the extension stem is coupled to the valve stem, the coupling may be disconnected, or the valve stem may be broken, and in such an event the targets within the indicator post are worse than useless, for they become misleading in that they do not record the true condition of the valve.

The object of my invention is to provide a valve, which is located beneath the surface of the ground and actuated by a rotatable spindle, with an indicator to indicate the position of the gate or gates in the valve case, whether they are open or shut; and means connected with the stem for operating the valve whereby the indicator is made to show whether the valve is in or out of working order, and whether or not the valve can be used for turning on water in case of fire.

This invention in addition to the ordinary open and shut targets placed within the indicator post, as usually constructed, has supplementary targets marked "Out of order" which appear under certain conditions at the same windows where the open and shut targets are displayed.

In the drawings,—Figure 1 is a vertical longitudinal section of the invention. Fig. 2 is a vertical longitudinal section taken at right angles to the section of Fig. 1, of the head or upper end of the indicator post. Fig. 3 is a cross section taken on the line 3—3 of Fig. 1. Figs 4 and 5 are detail views of the operating screw and the tell-tales. Figs. 6, 7 and 8, relate to modifications of the construction of the invention.

Similar reference characters indicate the same parts in the several figures of drawing.

The valve body 10, Fig. 1, contains the usual gate or gates, the open or closing of which it is desired to effect, and also to indicate their position and determine whether or not they are in working order. The spindle or stem 11, connected with a valve in the body 10, has a squared end 12 and for the purpose of illustrating this invention the stem is shown in a broken condition as at 13. A coupling or socket 16, is fitted onto the squared end 12, of the valve stem 11, and a square or round rod 14, with squared upper end 17, is extended to connect with the operating screw 15, said operating screw being cored out interiorly and formed with a squared socket to receive the squared upper end of the extension rod or stem 14.

The operating screw is provided at its upper end with a square or angular wrench head 18, and a collar 19, resting upon the cover 21, of the indicator post head 22. The operating screw is shown with the threaded portion 15', and unthreaded portions 23, 23, (see Fig. 4); and is retained and rotatably connected to the cover 21 by means of the screw collar 24, which is properly and suitably pinned in place.

The indicator herein shown consists of a target case 25, interiorly screw-threaded at one end as at 26, and adapted to engage with the threaded portion 15, of the operating screw socket, and prevented from dropping off by the nut 27. The target case 25, carries the two plates 28, 28, marked "Open" and "Shut" respectively, and the two "Out of order" plates 29 and 29; constituting the "tell-tale."

The target case 25, and the attached plates 28, 28, 29 and 29, are prevented from rotating, when the valve is in its normal working position, by the grooves 30, 30, on the case engaging the lugs or ribs 31, 31, on the interior of the indicator post head 22.

The arrangement of the indicator post in connection with the valve under the ground is in the usual manner; *i. e.:* the valve 10, is laid in a trench, and the cover of the valve carries a flange 32, to which the flange of the lower section 33, of the indicator post, is bolted. The indicator post is made, as usual, in two parts; the joint between the parts being telescopic, this telescopic portion 34 of the post being below the ground line.

The head 22, of the post has openings or windows on two opposite sides as at 35, through which one reads the targets or telltale plates.

In operation of my invention it will be seen by turning the upper squared end 18 of the operating screw socket 15, by a wrench or otherwise, and thereby rotating the connecting rod or stem 14, the tell-tale is raised or lowered by means of the screw thread on the socket according to the direction of rotation of said extended stem 12, and the telltale plates 28, 28, after a definite and predetermined number of turns of the operating screw socket corresponding to the number of turns required to open the valve over which the post is set, will be visible at the windows 35, 35.

The particular object of this invention is to indicate when the valve stem or the extension stem is out of order or broken, and which is accomplished in the following manner: The usual construction of all valves is that when the valve is fully opened or closed the moving parts within the valve case strike the top and the bottom of the valve respectively, or are limited in their movements. As above stated and described the open and shut targets appear at the windows in the post head at these definite times of limitations of travel of the moving parts within the valve case. In the event of the connection between the tell-tale and the valve stem becoming broken or disconnected, the tell-tale will not be limited in its travel but the target will move past the windows, or in other words, over-travel. Advantage is taken of this over-travel to provide just sufficient screw thread in the socket 15 so that the tell-tale will move a required distance to display "Out of order" plates at the windows. When these plates appear, the screw threads of the target case 25, run out of engagement with the threads of the operating screw socket 15 and onto a blank space 23, as shown in position by Fig. 1.

It is apparent that if the screw threads of the target case are on a blank space of the socket, then the socket may be turned an infinite number of times without moving the targets up or down.

To the manipulator of the post it is evident by the wording on the target and by the freedom of revolution of the screw socket for an indefinite time, that the valve and its post is in an "inoperative" condition.

I do not confine myself to the particular construction in which the operating screw for the target has unthreaded portions for the purpose of disengaging the screw thread of the target, but any other means of disengagement whereby an "Out of order" plate will appear to the observer in the place of the open and shut target.

In Figs. 7, 8 is shown a modification of the invention in which the tell-tale in lieu of running off the thread on to a blank space or unthreaded portion, the slot 30 of the tell-tale moves out of engagement with the guide 31, and when it does so, the tell-tale is free to revolve with the operating screw and cause the targets to appear at the windows.

Having now fully described my invention, what I claim as new and desire to secure by Letters Patent is:

1. An indicator for showing the inoperativeness of valves comprising a post, a valve stem adapted to be connected to a valve, an indicator and means for properly placing said indicator when said valve stem is broken or disconnected from said valve.

2. An indicator for showing the inoperativeness of valves comprising a hollow post, a r d and broken valve stem inclosed within the post adapted to be connected to a valve, an "inoperative" indicator, and means for operating the valve stem and rod and properly placing the indicator when said stem or rod is broken or disconnected from said valve.

3. An indicator for showing the inoperativeness of underground valves comprising a hollow post having a side opening, an extended valve stem adapted to be connected to a valve, an "inoperative" indicator, and means for operating the valve stem and moving the indicator before said opening when said stem is broken or disconnected from said valve.

4. An indicator for showing the inoperativeness of valves comprising a post, a valve stem adapted to be connected to a valve, a screw socket on said valve stem, an "inoperative" indicator mounted on the screw socket and adapted to be operated thereby on abnormal movement of a broken or disconnected valve stem, and means for rotating the valve stem.

5. An indicator for showing the inoperativeness of valves comprising a hollow post having an opening, a valve stem within said post and adapted to be connected to a valve, a screw socket on said valve stem having screw threads on its middle part and unthreaded or blank portion on its upper and lower sections, an indicator engaging and operated by the screw socket and moved over said opening, and means for rotating the valve stem and screw socket.

6. An indicator for showing the inoperativeness of valves comprising a hollow post having an opening, a valve stem within said post and adapted to be connected to a valve, a tell-tale connected to the valve stem and having an indicator for showing through said opening whether the valve connection is broken or disconnected, and means for operating the valve stem.

7. An indicator for showing the inoperativeness of underground valves comprising a hollow post having a side opening, a valve stem adapted to be connected to a valve, a tell-tale registering with said opening and indicating whether said valve stem has been disconnected or rotated beyond its normal movement, means for connecting said tell-tale to the valve stem, and means for operating the valve stem.

8. An indicator for showing the inoperativeness of valves comprising a hollow post having an opening and integral ribs, a valve stem within said post and adapted to be connected to a valve, a screw socket on said valve stem having screw threads on its middle part and unthreaded or blank parts at its upper and lower sections, an indicator engaging said ribs, and moved over said opening by screw socket, and means for rotating the valve stem and screw socket.

In testimony whereof I affix my signature in presence of two witnesses.

EDWIN H. WHITNEY.

Witnesses:
CHARLES L. MEAD,
BYRON K. FLACK.